United States Patent [19]

Degani et al.

[11] Patent Number: 4,973,126
[45] Date of Patent: Nov. 27, 1990

[54] OPTICAL FIBER CONNECTOR

[75] Inventors: Yinon Degani, Highland Park; Robert M. Kimball, Brick; Richard T. Kraetsch, Berkeley Heights; Robert M. Lien, Chester, all of N.J.

[73] Assignee: AT&T Bell Laboratories, Murray Hill, N.J.

[21] Appl. No.: 447,295

[22] Filed: Dec. 7, 1989

[51] Int. Cl.$^5$ .............................................. G02B 6/38
[52] U.S. Cl. ................................................. 350/96.21
[58] Field of Search ................ 350/96.20, 96.21, 96.22

[56] References Cited

U.S. PATENT DOCUMENTS

| 3,864,018 | 2/1975 | Miller | 350/96 |
| 4,593,972 | 6/1986 | Gibson | 350/96.21 |
| 4,594,121 | 6/1986 | Mitch | 350/96.21 |
| 4,688,886 | 8/1987 | Stoerk | 350/96.21 |
| 4,756,591 | 7/1988 | Fischer | 380/96.20 |
| 4,784,456 | 11/1988 | Smith | 350/96.21 |

OTHER PUBLICATIONS

Nagasawa, S. et al, "Reliability of V-Groove Optical Fiber Mass Splicing—Improvement of Splice Loss Temperature Characteristics," Rev. Electr. Commun. Lab., (Japan) vol. 33, No. 6, 1985, pp. 961–969.

Dakss, M. L. et al, "Field-Installable Connectors and Splice for Glass Optical Fiber Communications Systems," Twelfth Annual Connector Symp. Proc., Fort Worth, Pa., Electronic Connector Study Group, Inc., (1979) pp. 197–206.

Soster, M.-C. et al, "Optical Connectors with Low Insertion Loss and Tool Kit for Their Installation for Multimode Fiber Optics," Rev. Technique Thomson-CSF, vol. 17, No. 3, 9/85, p. 617.

Primary Examiner—William L. Sikes
Assistant Examiner—Robert E. Wise
Attorney, Agent, or Firm—P. V. D. Wilde

[57] ABSTRACT

A fiber optical end connector is disclosed, comprising a grooved base member having mounted thereupon a grooved silicon block, and means for holding optical fibers in the grooves on the base member and on the silicon block.

7 Claims, 2 Drawing Sheets

OPTICAL FIBER CONNECTOR

TECHNICAL FIELD

The invention relates to the field of optical fiber connectors.

BACKGROUND OF THE INVENTION

It has long been known that grooved, rigid members such as wafers or blocks are useful for supporting and aligning optical fibers. For example, U.S. Pat. No. 3,864,018, issued to C. M. Miller on Feb. 4, 1975, describes silicon wafers having multiple, parallel, V-shaped grooves formed in their upper and lower surfaces by crystallographic etching. In this patent, block-like structures having arrayed, parallel channels are created by stacking the wafers such that upper-surface grooves meet corresponding lower-surface grooves. Multiple optical fibers are aligned and potted in the channels to create an alignment block. A face of the block can be sawed along a plane perpendicular to the fibers, and subsequently polished, to make a mass fiber end-connector.

More recently, practitioners have used members having V-grooves to align the end portions of optical fibers in optical fiber connectors that are simple enough for field installation. One general category of such connectors makes use of a block or base member having a V-groove in its upper surface, into which the fiber end-portions are placed, and clamps for pushing down on the fiber portions to hold them in the groove. However, those connectors that have been proposed are too imprecise to join single-mode fibers, or else are expensive to manufacture because they involve complicated parts, or expensive materials in significant quantities, or relatively inexpensive materials together with stringent manufacturing standards.

For example, S. Nagasawa and I. Sankawa, "Reliability of V-Groove Optical Fiber Mass Splicing-Improvement of Splice Loss Temperature Characteristics," *Rev. Electr. Commun. Lab.*, (Japan), Vol. 33, No. 6 (1985), pp. 961–969, describes a connector comprising a plastic base and a pair of end blocks. Each fiber end-portion is engaged in one of the end blocks, and then the end blocks are mounted on the base such that the fiber end-portions are aligned and abutted in V-grooves on the base. Similarly, M. L. Dakss et al., "Field-Installable Connectors and Splice for Glass Optical Fiber Communications Systems," *Twelfth Annual Connector Symposium Proceedings*, Fort Worth, PA, Electronic Connector Study Group, Inc. (1979) pp. 197–206, also describes a plastic V-groove connector having three sections. Two plastic side pieces, each having a downward-sloping V-groove in its upper surface, engage a plastic central section by means of prongs and a locking screw. Two fiber ends meet in a V-groove in the upper surface of the central section. Such three-section connectors as the Nagasawa connector and the Dakss connector are disadvantageous in that they require the manufacture of three interlocking parts, and adequate precision can be assured in a plastic V-groove only by imposing stringent, and therefore relatively expensive, manufacturing standards.

As a further example, U.S. Pat. No. 4,784,456, issued to J. G. Smith on Nov. 15, 1988, and also M. -C. Soster et al., "New Low-Loss Mechanical Splices and the Special Tool Kit for Optical Communication," *Rev. Tech. Thomson-CSF(France)*, Vol. 17, No. 3 (1985) pp. 617–629, each describe a plastic connector comprising a grooved bottom section hinged to three top sections. Each of the top sections includes a projection that, when the section is in its closed position, urges and locks a fiber into position in a V-groove in the bottom section. These connectors are disadvantageous because it is relatively expensive to manufacture the complicated parts that are required.

As yet a further example, U.S. Pat. No. 4,756,591 issued to K. Fischer et al., on Jul. 12, 1988, describes a connector comprising a silicon base member having a V-groove cut in its upper surface. The upper surface has two end portions, and a central portion in which the two fiber ends meet. To hold the fibers in place, an elastomeric layer is pressed down on each of the portions of the upper surface. The force on the elastomeric layer is provided, for example, by a spring. A particular kind of spring described by Fischer is a retaining spring installed within a U-shaped claw that slips axially over the end of the base member and engages longitudinal flutes in the sides of the base member. This connector is disadvantageous because silicon is a relatively expensive material from which to manufacture an entire base member, and as a consequence, the resulting connector is relatively expensive.

Thus, practitioners in the field have only been partially successful in the search for a field-installable optical connector that is simple to use, economical to manufacture, and that is able to align pairs of fibers with high precision.

SUMMARY OF THE INVENTION

The invention achieves a useful combination of simplicity, precision, and low manufacturing cost by providing a simple connector manufactured primarily from, e.g., plastic, but also including a precisely formed V-groove in a silicon inset.

The invention is a V-groove optical fiber connector comprising a base of, e.g., plastic, and at least one silicon inset. At least one groove, here called a "central groove," is formed in the upper surface of the silicon inset. At least one pair of collinear grooves, here called "side grooves," is formed in the upper surface of the plastic base. The silicon inset is mounted on the base, for example, in a recess in the base, between the two collinear grooves such that the central groove is collinear with the two side grooves. The end portions of optical fibers to be joined are placed in the grooves such that the fiber ends meet in the central groove. Means are provided for holding the end portions of the fibers in the side grooves and in the central groove. In one embodiment of the invention, a cover plate is removably installed over the inset, such that the fiber ends are confined between the bottom of the central groove and the lower surface of the cover plate. In this embodiment, the holding means comprise three U-shaped spring clips that engage the plastic base from the side. The three spring clips include two side clips and one central clip. Each of the side clips holds a buffered portion of one of the fibers to be joined in its corresponding side groove. The central clip holds the cover plate in position over the inset, such that the cover plate presses down on the joint region, including the stripped ends of the fibers to be joined.

DETAILED DESCRIPTION

Figure 1:
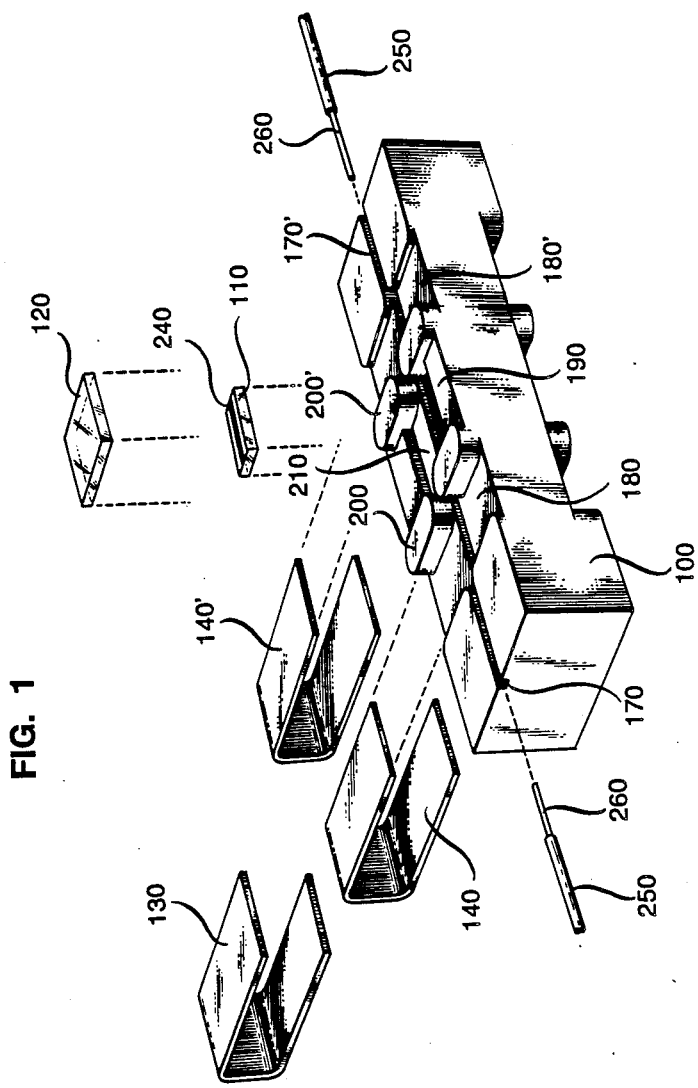
FIG. 1 is a perspective, exploded view of one embodiment of the inventive connector.
Figure 2:
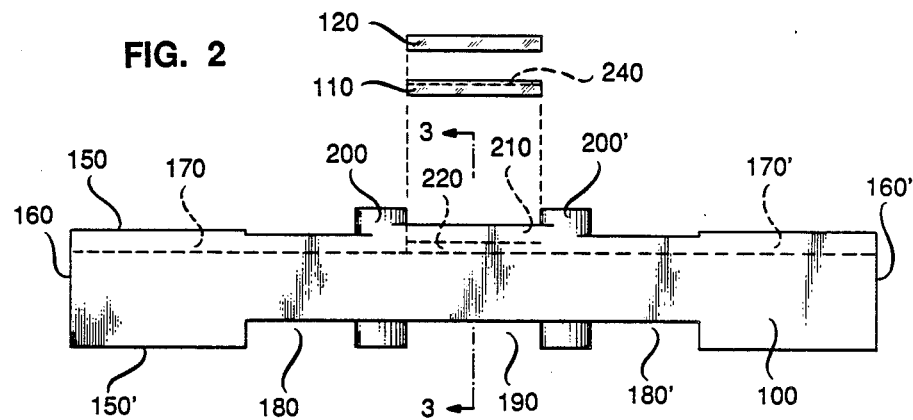
FIG. 2 is a cross-sectional side view of the connector of FIG. 1.

Turning now to FIG. 1, in the following embodiment, the connector comprises a base 100, a silicon inset 110, a cover plate 120, and three clamping devices, for example, a central spring clip 130 and side spring clips 140 and 140'. Cover plate 120 as depicted, for example, in FIG. 1 is a separate piece. Various alternative embodiments of the cover plate are readily made, for example, embodiments in which the cover plate and spring clip 130 are a single piece, and embodiments in which the cover plate is hinged to base 100. The shape of base 100 is not a crucial aspect of the invention, but for the purpose of supporting the end portions of optical fibers while conserving the material from which the base is manufactured, it is advantageous for the base to have an elongate shape with a longitudinal axis parallel to the end portions of the optical fibers that are to be joined. Thus, with reference to FIG. 2, base 100 has, for example, a rectangular shape, having ends 160 and 160', a longitudinal axis extending between the ends. Formed in surface 150 of base 100, here called the upper surface, are longitudinally extending side grooves 170 and 170'. Opposite surface 150 is surface 150', here called the lower surface. Formed in the upper and lower surfaces of base 100 are transverse guide grooves 180 and 180', and between them, transverse guide groove 190. Formed in the body of base 100 between groove 180 and groove 190, and projecting above the top and bottom surfaces of those grooves, is guiding projection 200. Similarly formed is guiding projection 200', formed between grooves 180' and 190.

Base 100 may be made from any suitably durable material, but for economy and ease of manufacturing, is preferably made of plastic. The base is readily formed by machining or, for even greater manufacturing economy, by injection molding. Examples of desirable materials for base 100 are PBT, PPS, and LCP. These are easy flowing, fast cycling plastics. They are desirable because they have dimensional stability, high heat-distortion temperatures, high surface hardness, and a UL-94 V-O flame-retardant rating.

The length and width of the base are chosen to provide adequate area to support the end portions of the fibers to be joined, and, preferably, the base should be wide enough to be easily held between a user's fingers. The base should be long enough to support at least 0.5 inches (13 mm) of each of the fibers to be joined, because if the supported lengths are substantially shorter than this, there will not be adequate strain relief. However, the end portions should not be longer than about 2 inches (51 mm), because a substantially longer connector would be inconvenient to handle and would conflict with spatial limitations in at least some applications. The thickness of the base is chosen to provide enough rigidity to adequately support the fiber connection. The base is rigid enough for this purpose if it will not deform substantially during ordinary handling. Moreover, the height of the base must sufficiently exceed the depth of the side grooves to prevent the base from cracking along the side grooves in the course of ordinary use. Exemplary lateral dimensions for the base are length, 1.5 inches (38 mm); and width, 0.5 inches (13 mm). Corresponding values for the thickness are: between end 160 and groove 180, about 0.21 inches (5.3 mm); within groove 180, about 0.15 inches (3.8 mm); at projection 200, about 0.25 inches (6.4 mm); and within groove 190, about 0.17 inches (4.3 mm). Generally, corresponding features at opposite positions along the longitudinal axis are mirror-images of each other.

Figure 3:
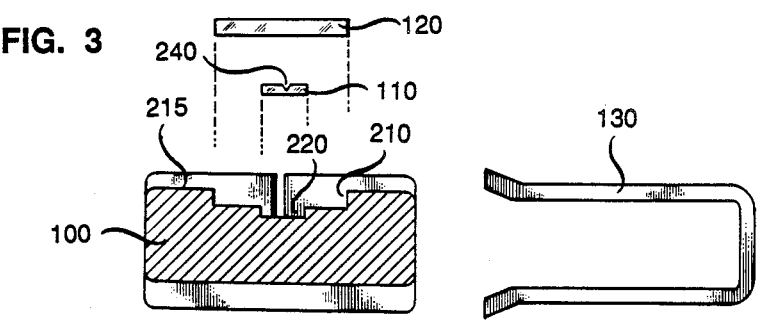
FIG. 3 is a cross-sectional end view, taken through 3-3 of FIG. 2.

Turning now to FIG. 3, also formed in the upper surface of base 100 is recess 210. For manufacturing simplicity, recess 210 is rectangular in shape, and extends longitudinally between projections 200 and 200' (shown in FIG. 2). The transverse extent of recess 210 is smaller than the width of the base, thus leaving a shoulder portion 215 of the base on each side of recess 210. Exemplary dimensions of recess 210 are: length and width, about 0.26 inches (6.6 mm); and depth, about 0.03 inches (0.76 mm).

Also formed in the upper surface of base 100 is recess 220. Recess 220 is formed in the bottom of recess 210, and extends longitudinally in the bottom of recess 210. For manufacturing simplicity, recess 220 preferably extends longitudinally the full length of recess 210, since if it did not, at least one of the side grooves would have to be extended into recess 210 for receiving a portion of a fiber to be joined. Exemplary dimensions of recess 220 are: width, about 0.085 inches (2.2 mm), and depth, about 0.018 inches (0.46 mm).

Figure 4:
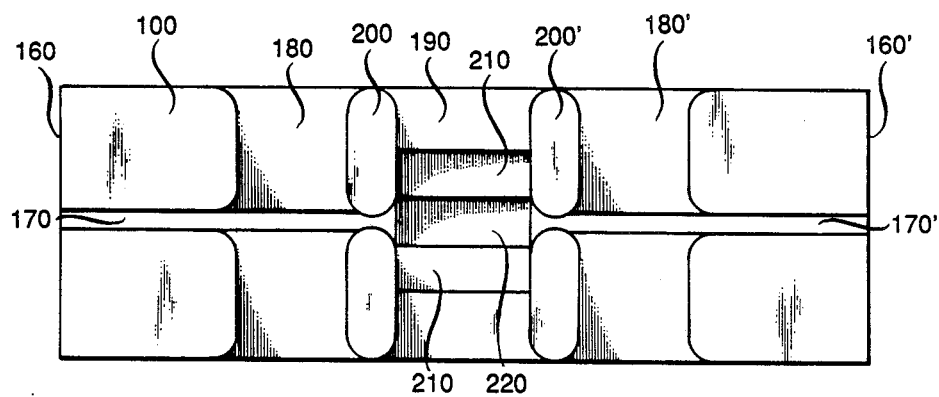
FIG. 4 is a top view of the connector of FIG. 1.

Turning now to FIG. 4, side grooves 170 and 170' extend, respectively, from ends 160 and 160' to recess 210. The side grooves are, for example, U-shaped in cross section. (Grooves that are, alternatively, rectangular or V-shaped in cross section are also readily made and used.) The dimensions of the side grooves are selected relative to the outer diameter of the outer jacket of the fibers to be joined. A buffered fiber should be capable of easy placement within the side grooves without any substantial compression of the jacket. When pressed snugly against the bottom or sides of the groove, the upper surface of the fiber jacket should lie slightly above the top of the side groove where the side groove passes through guide groove 180 or 180'. The extent of the fiber jacket above the side groove should be such that when moderate manual force is applied in order to slip spring clip 140 or 140' (shown in FIG. 1) over the fiber, the fiber is held firmly within the side groove. An exemplary side groove has a bottom portion that is semicircular in cross section, with a vertical wall portion extending above the semicircular portion (with the possible exception of the groove portions within guide grooves 180 and 180', where the vertical wall portion may be absent). If a fiber is used having an outer jacket diameter of, for example, 0.035 inches (0.89 mm), then typical groove dimensions are: for the semicircular portion, a diameter of about 0.038 inches (0.97 mm), and for the total depth near the ends of the base, about 0.038 inches (0.97 mm). Side grooves 170 and 170' are constricted laterally where they pass, respectively, through projections 200 and 200'. That is, at least some portion of e.g., side groove 170 where it passes through projection 200 has a maximum width that is greater than the outer glass diameter of the optical fibers to be joined, but smaller than the outer diameter of the outer jacket. As a consequence, projection 200 functions as a stop for controlling the insertion of an optical fiber into the end of side groove 170. That is, when the end portion of a fiber is stripped prior to insertion, the stripped portion will fit through the constriction within projection 200, but after the outer jacket of the fiber encounters the constriction, no further insertion will be possible.

Turning again to FIG. 3, silicon inset 110 is mounted within recess 220 flush with the walls of recess 220. Although it is not required, the inset is readily permanently affixed to the base by the use of an adhesive, for example, two-component epoxy adhesive. The upper surface of the inset is continuous with the upper surface of base 100 within recess 210. Formed in the upper surface of the inset and extending longitudinally through the center of the upper surface of the inset is groove 240.

Each of the side grooves should be laterally aligned with the central groove to within about 80 microns, and is preferably laterally aligned with the central groove to within about 15 microns. That is, when the jacketed (i.e., buffered) portion of the fiber is properly seated in the side groove, the stripped end portion of the fiber should be aligned in the central groove such that the center of the fiber is laterally offset from the center of the groove by no more than about 80 microns, and preferably no more than about 15 microns. If the lateral offset of the fiber in the central groove is too great, the fiber will tend to be driven out of the central groove when the cover plate is clamped over it. By contrast, if the fiber is approximately centered within the central groove, it will be urged into alignment when the cover plate is clamped over it. If the offset is greater than about 80 microns, the fiber will be driven out of the central groove on an unacceptably large fraction of attempts. By contrast, if the offset is about 15 microns or less, a desirably large fraction of attempts will succeed in urging the fiber into alignment.

Each of the side grooves should also be vertically aligned with the central groove such that when the jacketed portion of the fiber is properly seated in the side groove, the vertical offset of the stripped end portion of the fiber is no more than about 250 microns, and preferably no more than about 25 microns. By vertical offset is meant the vertical displacement between the center of the fiber portion seated in the side groove and the center of the fiber portion seated in the central groove after the cover plate has been clamped over it. If the vertical offset is greater than about 250 microns, optical losses due to microbending are likely to reach unacceptable levels. If the vertical offset is between about 25 microns and about 250 microns, microbending losses are likely to be acceptable, but there is still a significant likelihood of fracturing the fiber as a result of bending. If the vertical offset is about 25 microns or less, the likelihood of fracturing the fiber as a result of bending is desirably small.

Thus, for purposes of the invention, each side groove is collinear with the central groove (and thus the side grooves are collinear with each other) when the side groove is laterally aligned with the central groove to within about 80 microns, and preferably within about 15 microns, and the side groove is vertically aligned with the central groove such that when the jacketed portion of the fiber is properly seated in the side groove, the vertical offset of the stripped end portion of the fiber is no more than about 250 microns, and preferably no more than about 25 microns.

In cross section, groove 240 is V-shaped, or U-shaped. Groove 240 is readily formed by machining, or preferably, for manufacturing economy, by etching the upper surface of inset 110. In particular, a V-shaped groove is readily made by crystallographic etching, as described, for example, in E. J. Murphy, "Permanent Attachment of Single-Mode Fibers to Waveguides," *J. Lightwave Tech.*, Vol. LT-3, No. 4(1985). Referring back to FIG. 1, the dimensions of groove 240 are selected such that when the outer jackets 250 of each of two optical fibers to be joined rest without distortion against the bottom portions, respectively, of side grooves 170 and 170', the corresponding stripped glass fiber end portions 260 extending longitudinally into groove 240 will each be supported by the surface of groove 240 without relative vertical deflection of the two fiber ends of more than 1 micron, and at or near the point where the fibers join, the angle between the longitudinal axes of the two fibers does not deviate from perfect collinearity by more than 5 degrees.

The dimensions of groove 240 should be selected such that when the end portion 260 of the fiber (shown in FIG. 1) is properly seated in the groove, the top of fiber portion 260 is even with the top of the groove or, preferably, the top of the fiber portion extends slightly above the top of the groove. That is, if the top of fiber portion 260 lies below the top of the groove, cover plate 120 will be unable to exert any force on the fiber portion, and, as a consequence, it will be impossible to employ the cover plate in order to urge the fiber portion into proper alignment in the groove. If the top of the fiber portion is even with the top of the groove, the desirable contact with the cover plate is possible, but such contact may be frustrated by the presence of dust particles between the cover plate and the surface of inset 110. If the cover plate rests on such a dust particle or particles, it will tilt and, as a consequence, will not make the desired contact with the fiber portion.

By contrast, if the top of the fiber portion extends above the top of the groove by more than one-half the diameter of the fiber portion, it will tend to roll out of the groove when the cover plate is applied. (By "the diameter of the fiber portion" is meant the stripped, i.e., the glass, diameter of the fiber.)

Thus, the top of the fiber portion should be at least even with the top of the groove but should not extend more than one-half the glass diameter above the top of the groove. Preferably, the top of the fiber portion should extend about one-fourth the glass diameter above the top of the groove.

For example, if a fiber is used having an outer glass diameter of 0.005 inches (0.13 mm), then, typically, groove 240 is a V-groove having a base angle of 54 degrees (stated alternatively, the V-groove is, in cross section, an isosceles triangle having, at the bottom of the groove, a vertex angle of 72 degrees), a maximum width of about 0.007 inches (0.18 mm), and a depth of about 0.005 inches (0.13 mm).

Central groove 240 is, for example, continuous with side grooves 170 and 170'. That is, groove 240 is not only collinear with the side grooves, but furthermore, there is no gap between groove 240 and the side grooves. It is not essential, however, for the central and side grooves to be continuous, and alternative embodiments can readily be made in which one or both side grooves are separated from the central groove by a gap or trench. Such a gap or trench should not be more than a few millimeters in length, however, in order to avoid bending of the unsupported span of fiber over the gap or trench, and consequential breaking of the fiber.

With reference to FIG. 1, spring clips 130, 140 and 140' are adapted to slide laterally in grooves 190, 180, and 180', respectively. The three spring clips are readily made of stainless steel, or of other spring materials well known in the art.

With reference to FIG. 3, cover plate 120 may be made of any material sufficiently rigid to distribute a downward force exerted by spring clip 130 uniformly over the length of groove 240. Because it affords an opportunity for inspection, glass is the preferred material of cover plate 120. The cover plate fits flush in recess 210. When the cover plate is placed in recess 210, the upper surface of the cover plate is coplanar with the upper surface of base 100 at shoulder portions 215.

Multiple fiber connectors are readily constructed using the same principles. For guiding and aligning the stripped end portions of multiple fiber pairs, either multiple silicon insets having single grooves can be used, or single or multiple silicon insets having multiple grooves can be used.

A method for using the inventive connector to connect a pair of buffered optical fibers is described below, with reference to FIG. 1.

First, the fibers are prepared by stripping about 3 cm of the end portion of each fiber. Both the outer jacket (e.g., the buffer coating) and the inner jacket (e.g., the acrylate coating) are removed, exposing 3 cm of glass fiber. The glass fiber is then cleaned with alcohol.

Each glass fiber is then cleaved about 6–7 mm from the end of the jacket. The cleaved end of the fiber must be free of glass splinters.

Before connecting the fibers, spring clips 130, 140, and 140' are slid back to expose, respectively, grooves 240, 170, and 170', and cover plate 120 is removed from the connector.

One fiber is placed in, e.g., groove 170, and held in place with finger pressure. The end of the fiber should lie roughly at the center of groove 240. Spring clip 140 is then pushed all the way into groove 180.

The other fiber is then placed in groove 170', with the end lying in groove 240. There should be a gap of about 0.5 mm between the ends of the two fibers in groove 240. Spring clip 140' is then pushed all the way into groove 180'.

A small drop of index matching gel is then inserted in the gap between the fibers. Cover plate 120 is then placed in recess 210 (best shown in FIG. 4), covering the fiber ends in groove 240. Spring clip 130 is then gently pushed in a short distance, to slightly cover the nearer edge of cover plate 120.

One of the other spring clips, e.g., spring clip 140, is then pushed back to expose the fiber beneath it. While gentle finger pressure is applied to cover plate 120, the exposed fiber is gently pushed toward the opposing fiber until the fibers make contact and resistance to further motion of the exposed fiber is encountered. Spring clip 140 is then fully pushed back into its groove.

Spring clip 130 is then gently pushed all the way into groove 190 and squeezed into place by firm finger pressure, completing the connection.

We claim:

1. A fiber optical connector for connecting at least one pair of optical fibers end-to-end, comprising:
   a base member having first and second ends and an upper surface;
   a first groove disposed in the upper surface, the first groove extending essentially in a straight line from the first end toward the second end;
   a second groove disposed in the upper surface, the second groove essentially collinear with the first groove and extending from the second end toward the first end;
   a third groove intermediate and collinear with the first and second grooves;
   and means for holding optical fibers in the first, second, and third grooves,
   characterized in that
   the connector further comprises a silicon block mounted on the upper surface intermediate the first and second ends, the silicon block having a top surface, and the third groove being disposed in the top surface of the silicon block.

2. The connector of claim 1, wherein the upper surface includes a recess intermediate the first and second ends, and the silicon block lies within the recess.

3. The connector of claim 1, wherein the third groove is crystallographically etched.

4. The connector of claim 1, wherein the first and second grooves are each adapted for supporting a buffered optical fiber, and the third groove is adapted for supporting a pair of stripped optical fiber end portions.

5. The connector of claim 4, further comprising a cover plate adapted to cover a pair of stripped fiber end portions lying in the third groove.

6. The connector of claim 1, wherein the holding means are not hinged.

7. The connector of claim 1, wherein the holding means are spring chips.

* * * * *